United States Patent [19]

Wilson

[11] 3,928,774

[45] Dec. 23, 1975

[54] BIPOLAR LOG CONVERTER

[75] Inventor: Homer M. Wilson, Houston, Tex.

[73] Assignee: Petrolite Corporation

[22] Filed: Aug. 5, 1974

[21] Appl. No.: 494,443

Related U.S. Application Data

[62] Division of Ser. No. 436,250, Jan. 24, 1974, Pat. No. 3,855,101.

[52] U.S. Cl. ............... 307/229; 307/25 S; 328/145
[51] Int. Cl.² .................... G06G 7/12; G06G 7/24
[58] Field of Search ..... 328/145; 307/229; 235/193, 235/197

[56] References Cited
UNITED STATES PATENTS

| | | | |
|---|---|---|---|
| 3,329,836 | 7/1967 | Pearlman | 328/145 |
| 3,448,289 | 6/1966 | Harris | 328/145 |
| 3,584,232 | 6/1971 | Wallace | 307/229 |
| 3,681,618 | 8/1972 | Blackmer | 328/145 |

Primary Examiner—Stanley D. Miller, Jr.
Assistant Examiner—B. P. Davies
Attorney, Agent, or Firm—Emil J. Bednar

[57] ABSTRACT

A bipolar log converter capable of receiving bidirectional current I and providing (a) a continuous potential signal having a polarity representative of the flow direction of the current, (b) the potential signal having a magnitude representative of the current, and (c) the potential signal changing polarity upon a change in the flow direction of the current. This converter is especially useful in a novel dynamic analyzer for evaluation of voltage-current related properties in an external system and, in a particular application, to a unique potentiostat employed in performing electrochemical analysis of corrosion phenomena in a test cell.

The bipolar log converter employs a unique voltage network or bridge using series connected rectifier pair biased into a conducting state. The bidirectional current I flows in only one rectifier to produce a conversion logarithmically into a potential. This potential in the network produces at its output a potential signal $\pm V = I$. Temperature compensation for the network is also disclosed.

16 Claims, 7 Drawing Figures

BIPOLAR LOG CONVERTER

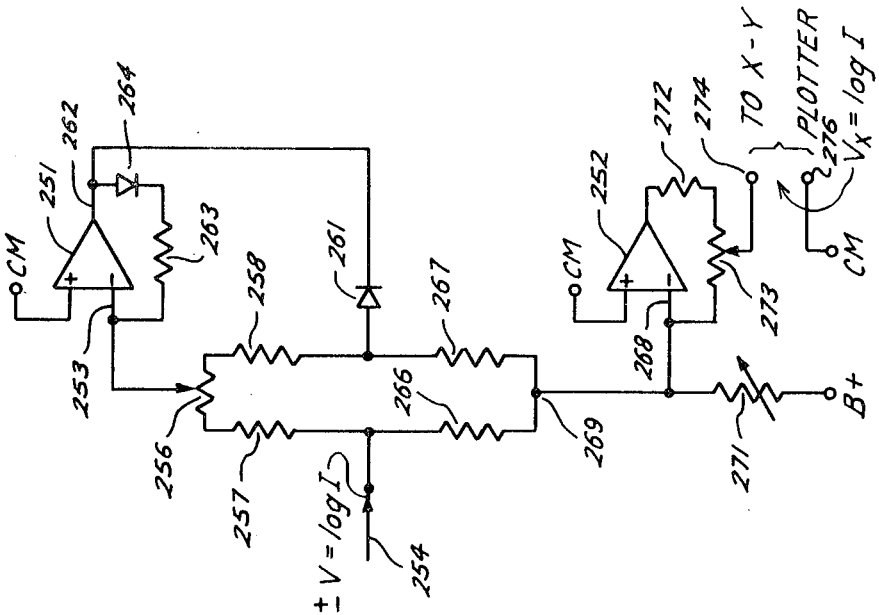
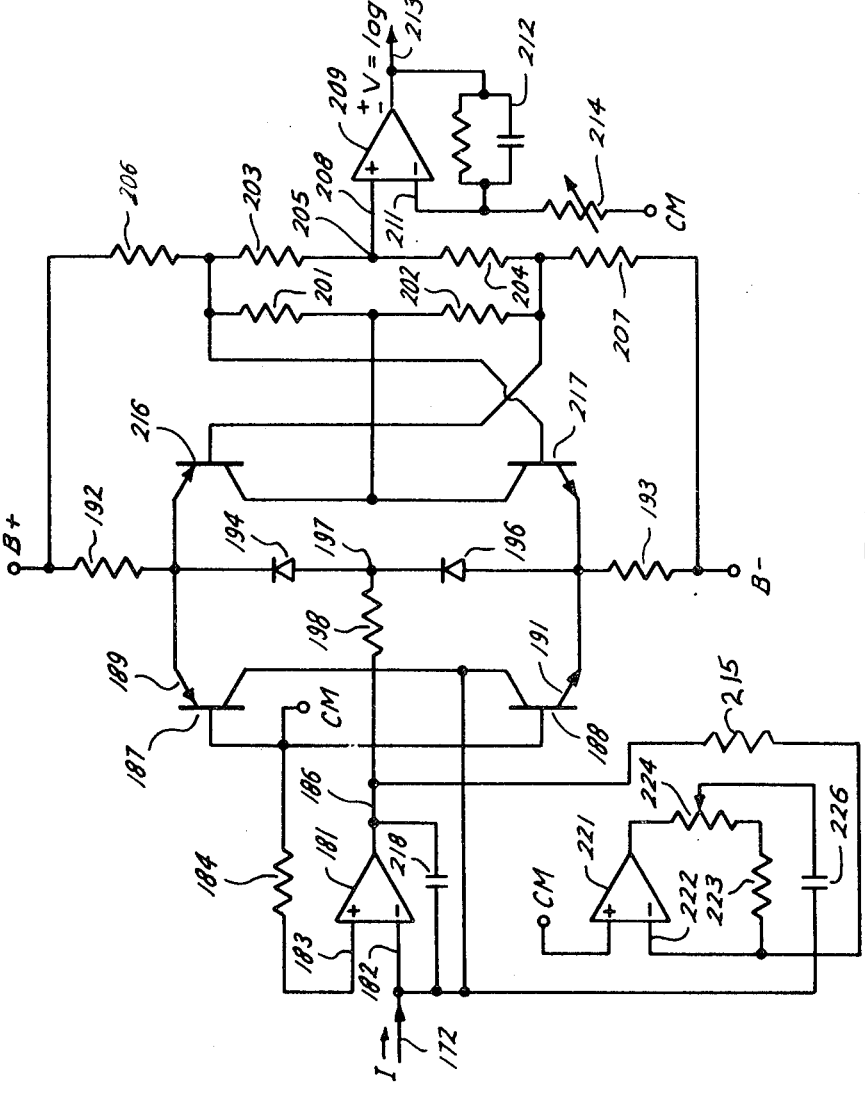

BIPOLAR LOG CONVERTER

This application is a division of application Ser. No. 436,250 filed Jan. 24, 1974, now U.S. Pat. No 3,855,101.

BACKGROUND OF THE INVENTION

1. Field of the Invention

This invention relates to measuring and testing electrochemical processes; and it relates particularly to instruments for the practice of electrochemical and electroanalytical techniques used in the study of corrosion processes in conductive media.

2. Description of the Prior Art

In the field of electrochemical and electroanalytical instruments and processes, many types of analyses can be performed in external systems which have voltage-current related properties. The study of corrosion phenomena is one such area. Other areas include, but are not limited to, the following: phase-sensitive AC, pulse, and DC polarography; anodic stripping analysis; cycling and potential sweep voltammetry; pH and specific ion measurement; direct potentiometry; controlled potential and controlled current electrolysis; chronopotentiometry; chronoamperometry; pulse response studies; electrical double layer capacitance measurements; itensiostatic, potentiostatic, and potentiokinetic methods for corrosion studies; and performing corrosion measurements as described in U.S. Pat. No. 3,101,406.

Instruments for practicing these analyses may be denoted, in a most general sense, as "potentiostats." Such instruments are arranged to produce and maintain a given voltage within the external system having voltage-current related properties by regulation of the current flowing therethrough. The potentiostatic instruments usually include a high impedance voltmeter for determining the maintained potential, a current source capable of maintaining a current flow to insure a constant value for the induced potential, and various auxiliary equipment which includes the cells, electrodes, and so forth, forming the external system, and various types of readout devices (ammeters, voltmeters, recorders, scopes, etc.). The auxiliary equipment can also include timers, recorders, and function generators capable of producing pulses, square waves, sawtooths and sine wave voltage sweeps. The readout means include oscilloscopes, various forms of wave analyzers, and impedance bridges.

The external system can be the classic types of electrochemical cells such as dropping mercury electrodes, hydrogen and glass reference electrodes, specific ion electrodes, metal electrodes and various combinations of such electrodes. These external systems all have a common characteristic at their electrical terminals. The external systems exhibit voltage-current related properties at their terminals. In particular, a potential can be induced between a first pair of terminals, and other terminals are employed for passing a current through the cell which induces and maintains such potential. The magnitude and direction of the current flow and its function with time have a prescribed relationship to induced potential. These related properties of voltage and current are definitive of the electrochemical and electroanalytical composition of the cell.

The most common analysis of external systems having voltagecurrent related properties in aqueous media is voltammetry. In voltammetry, a pair of electrodes are employed for sensing the induced potential in the system. Other electrodes are employed for passing current through the conductive media for inducing the potential between the first electrode pair. The induced potential may be maintained constant for a given period of time, or it can be varied from a first, to a second, or even to a third, magnitude and varied at a constant rate with time, or with other functions with time such as exhibited by a sine wave or triangular wave.

Another electrochemical analysis of an external system found in measurements of corrosion phenomena is described in U.S. Pat. No. 3,406,101. In this patent, there is described an external system formed by a corrosion cell containing an aqueous corrodant in which are immersed three electrodes. Current is passed between two electrodes and induces a potential relative to a third electrode (reference). The current flow required to induce a certain potential change between the reference and one other electrode (test) is employed to determine the rate of corrosion which is occurring at the test electrode in the cell. Thus, the current flow in such a cell is the "readout" of the corrosion occurring at the test electrode.

The known external systems having voltage-current related properties have a plurality of terminals and conventionally have at least four terminals (e.g., two terminals to sense induced potential and two terminals to maintain current flow). For example, four-electrode conductivity cells are an external system having voltage-current related properties in which the potentiostatic instruments find ready application.

Prior art instruments employed in the electrochemical and electroanalytical field, particularly potentiostatic instruments, have provided useful results. However, these instruments left much to be desired in easy and reliable operation. First, the induced potential in the external system either had to be maintained at fixed levels for given lengths of time, and then changed with a square wave function to other levels in order to insure stable operation. Voltage sweeping has been attained, for the most part, by motor-driven rheostats which suffer from mechanical and electrical aberrations (i.e., nonlinear sweeping). In addition, should the voltage sweep direction of the induced potential be reversed, a time lag in voltage shift was experienced (i.e., discontinuous operation). A linear change in voltage within the external system is produced by a logarithmic change in current. Thus, a voltage shift of several tenths of a volt could change the current over several decades in magnitude. This linearlogarithmic property required complex switching equipment to insure even moderately accurate measurement in the magnitude of current flow. Furthermore, a third problem immediately arises. Since the data or readouts were in the linear voltage-amperage measurement system, correlating a certain voltage change to a certain current magnitude required a manual plot of volts and amperes upon log function graph paper or other such means. The voltage of the external system can be swept linearly over an extended range (0–10 volts) by the potentiostatic instrument. The current magnitude can change responsively over eight decades in less than 0.5 volts and is very difficult to obtain from linear data whose accuracy is good only for about four decades. Thus, the instrument operator was never sure that the voltage sweep information in his readout was directly correlatable to the related current magnitude. These operational difficulties in prior instruments have prevented the ready and accurate application of the electrochemical and electroanalytical techniques in evaluating corrosion phenomena, and other related analysis of external systems having voltage-current related properties. The present invention is directed towards an instrument which avoids these problems.

SUMMARY OF THE INVENTION

In accordance with this invention, there is provided a bipolar log converter including a differential input amplifier having one input receiving a bidirectional current signal, another input connected to circuit common of a DC power supply, and an output carrying a voltage representative of the current signal. Rectifier means are series connected and at their common junction are connected to said input of the differential input amplifier receiving the current signal. A voltage biasing network provides a current flow through the rectifier means for placing them into a conducting condition for nonlinear potential-current conversion. An output circuit is series connected across the rectifier means and their common junction connects to the output of the differential input amplifier thereby forming a feedback loop wherein the current signal passes through one of the rectifier means to the amplifier's output for creating a potential in the output circuit, and means to provide from said potential a continuous potential signal representing the current signal whereby the potential signal has a polarity representative of the flow direction of the current signal and a magnitude representative of the logarithm of the current signal, and the potential signal changes polarity upon a change in flow direction of the current signal.

DESCRIPTION OF THE DRAWINGS

FIG. 5 is a schematic of a bipolar log converter employed in the present dynamic analyzer;

FIG. 6 is a schematic of the absolute value circuit employed with the dynamic analyzer of the present invention.

DESCRIPTION OF SPECIFIC EMBODIMENTS

Figure 1:
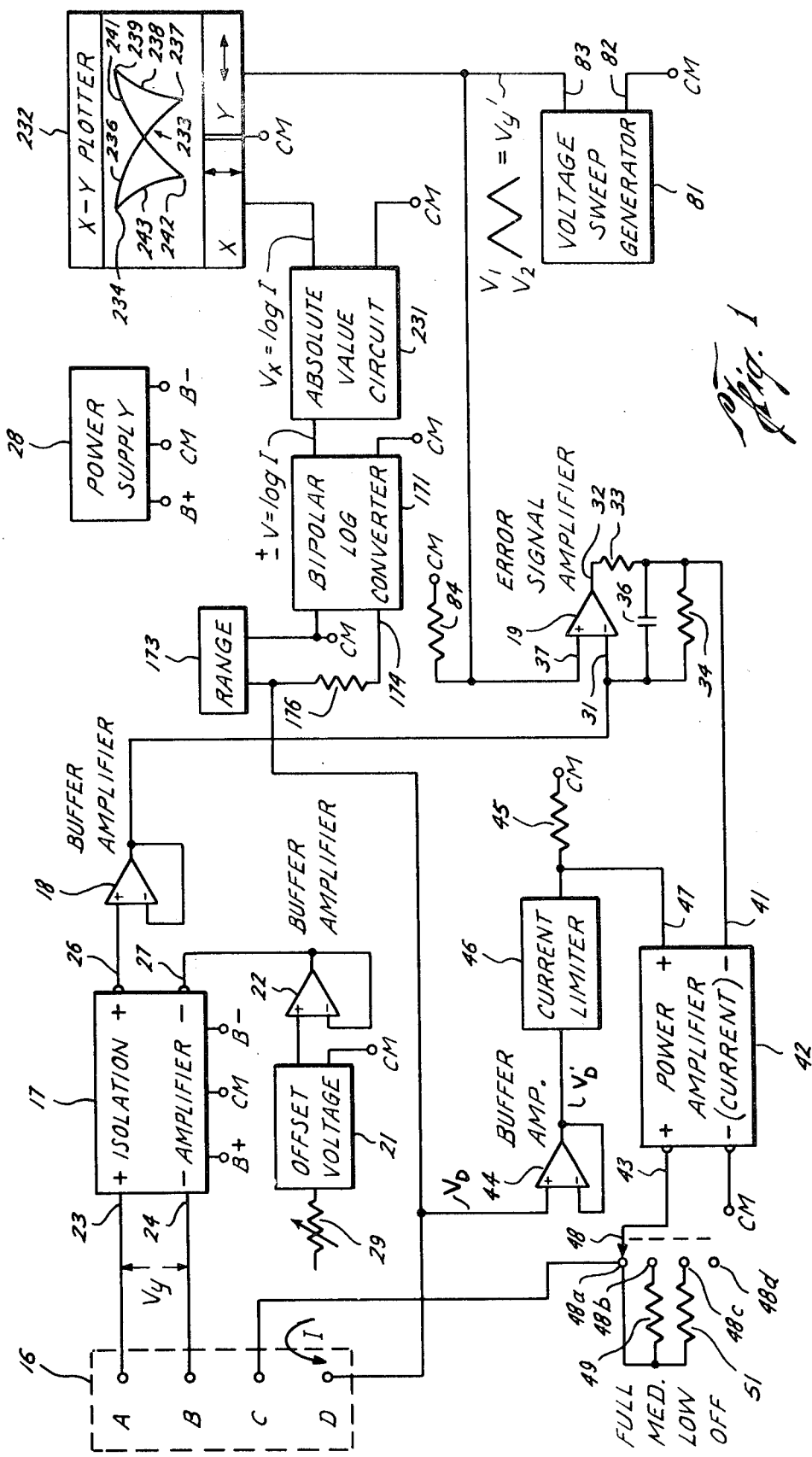
FIG. 1 is an electrical block diagram showing the various elements comprising the dynamic analyzer of this invention.

In FIG. 1, there is shown in a block diagram a preferred embodiment of the dynamic analyzer of the present invention. The dynamic analyzer, as identified by legends, is comprised of an input circuit which includes a pair of terminals A and B and may contain an isolation amplifier, and output means for producing a first voltage signal representative of the potential difference $V_y$ at these terminals. This first voltage signal is summed to a second voltage signal in an error signal amplifier with a linear sweep voltage signal $V_y{'}$ from a voltage sweep generator, and if desired, an offset voltage from an offset voltage source. The second voltage signal (error signal) drives a power amplifier which passes, bidirectionally, current between a pair of terminals C and D. The power amplifier may be protected by a current limiter. The current I from the power amplifier is monitored by a bipolar log converter having a bipolar potential signal output of $\pm V = \log I$. Preferably, the bipolar potential signal is applied to an absolute value circuit which provides a unipolar voltage output signal $V = \log I$. The signal output from either the bipolar log converter or absolute value circuit is applied to a readout means, such as an X-Y plotter, wherein either signal is directly readable, as log I over several decades, in direct coordination and comparison to the linear sweep voltage $V_y{'}$.

Figure 2:
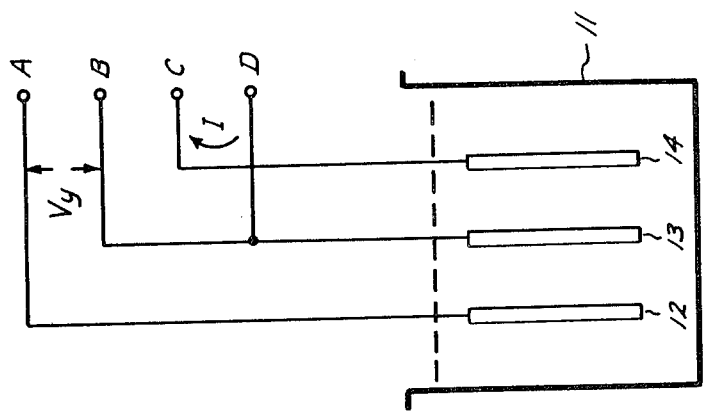
FIG. 2 is an illustration of a three electrode corrosion cell which has voltage-current related properties and four terminals A, B, C and D.

For purposes of the present description, the external system may be a three electrode corrosion measurement cell as connectable to the dynamic analyzer. The corrosion cell 11, as shown by reference to FIG. 2, is formed by a container with electrodes 12, 13 and 14 immersed in an aqueous corrodant. The electrodes 12, 13 and 14 will be described in the functions of reference, test specimen, and third or auxiliary current electrodes, respectively. Electrical conductors connect the electrodes 12, 13 and 14 to terminals A, B, and C, respectively. In addition, terminal D also connects to the test electrode 13. Thus, the cell 11 forms a four terminal external system in which terminals A and B are employed for sensing the induced potential $V_y$ at electrodes 12 and 13 and terminals C and D for passing current (I) through the corrodant and between electrodes 13 and 14. Returning now to FIG. 1, the terminals A, B, C and D are connected to the terminal block 16 forming an interface between the cell 11 and the dynamic analyzer. The terminals A and B connect with an input circuit for sensing the potential $V_y$ and having an output means in a voltage loop for producing a voltage signal representative thereof. An isolation amplifier 17 may be included in the voltage loop for maintaining high impedance in the input circuit or for other reasons. The voltage loop may include an isolation amplifier 17, a buffer amplifier 18, an error signal amplifier 19, and a source of offset voltage 21 which includes a buffer amplifier 22. An input circuit at high impedance is formed about the terminal block 16 at terminals A and B so that no significant changes are made to the sensed potential $V_y$ at cell 11.

The isolation amplifier 17 may be of any conventional type having high input impedance and common mode rejection. The isolation amplifier 17 is a dual input-output differential amplifier having positive and negative inputs 23 and 24 connected to the reference and test electrodes 12 and 13, respectively. The amplifier 17 may have a component gain of 50,000 or greater, but the components of the input circuit associated with such amplifier 17 adjust the input-output circuit gain to approximately unity. This arrangement of the isolation amplifier 17 provides an input circuit which has exceedingly high impedance input, stability and a high common mode of rejection. The isolation amplifier 17 has the usual connections at terminals B+, B− and common (CM). Power supply 28 provides operative power for the present dynamic analyzer.

The positive and negative outputs 26 and 27 of the isolation amplifier 17 are connected in the voltage loop to the buffer amplifier 18, the error signal amplifier 19, the offset voltage source 21, the buffer amplifier 22, and circuit common. The output 26 is matched through the buffer amplifier 18 to be a relatively low impedance at the error signal amplifier 19. The error signal amplifier 19 may be of conventional design and with the usual connections to the power supply 28. Preferably, the amplifier 19 is a differential amplifier for purposes of insuring a tracking of the input voltage $V_y$ to the isolation amplifier 17 with the sweeping voltage $V_y'$. The error signal amplifier 19 has a first input 31 connected to its output 32 through a feedback network of resistors 33 and 34 with a shunting capacitor 36 providing a modified time constant function. With this feedback arrangement, the amplifier 19 has a substantially low gain at high frequency for stability purposes. The voltage sweep signal $V_y'$ is applied to the second input 37 of the amplifier 19. Thus, input 31 receives a voltage signal $V_y$ corresponding to the input voltage between the inputs 23 and 24 of the isolation amplifier 17. The voltage sweep signal $V_y'$ at input 37 is summed with the potential $V_y$ and the error signal amplifier 19 produces a voltage signal at its output 32 which is a function of the difference between these voltage signals at the inputs 31 and 37. This voltage signal is the error signal voltage which is applied to an input 41 of the power amplifier 42.

The error signal voltage at the input 41 drives the power amplifier 42 to provide in output 43 an output current I which flows between terminals C and D and the electrodes 13 and 14 in cell 11. From terminal D, current I returns to circuit common through the range resistor network 173 and through input resistor 176 to input 174. The voltage $V_D$ at terminal D and at input (+) of buffer amplifier 44 is therefore proportional to I. Amplifier 44 has an output $V_D'$ applied to current limiter 46. Current limiter 46 controls input 47 of power amplifier 42 so that output 43 can never exceed $I_{max}$ of the cell at terminal D. The power amplifier 42 produces the current I in output 43 and causes polarization potential $V_y$ to be formed between electrodes 12 and 13. This potential appears in the voltage loop at input 31 of the error signal amplifier 19 and summed with the sweep voltage $V_y'$ appearing at input 37. Any difference in voltage between inputs 31 and 37 produces the error signal at the input 41 of the power amplifier 42 which adjusts the current I so that the induced potential $V_y$ appearing at inputs 23 and 24 of the isolation amplifier 17 is precisely equal to, or tracks, the sweep voltage $V_y'$.

In some cases, it is desired to have the potential $V_y$ between the electrodes 12 and 13 summed with a fixed potential (offset) at the inputs 23 and 24. It may be desired to determine a corrosion environment in cell 11 where the induced potential $V_y$ at electrodes 12 and 13 is changed by some small fixed potential, for example, 100 millivolts. For this purpose, the output 27 of the isolation amplifier 17 connects to circuit common through the offset voltage source 21 and the buffer amplifier 22. The buffer amplifier 22 merely provides an impedance adjustment and isolation between the offset voltage source 21 and the output 27. The offset voltage source 21 may be a high impedance voltage divider network connected to the power supply 28 with an adjustable voltage control indicated by the rheostat 29. The offset voltage is a selected steady state value of positive or negative polarity. This offset voltage is summed precisely with the voltage $V_y$ appearing in the output 26, and the resultant voltage appears at the input 31 of the error signal amplifier 19. As a result, this circuit functions identically as previously described but with the potential $V_y$ between the electrodes 12 and 13 now tracking the sweep voltage $V_y'$ by a fixed offset voltage magnitude provided by the offset voltage source 21 ($V_y = V_y' \pm$ offset voltage).

Switch 48 and its resistors 49 and 51 are for applying a limited small current to the external cell 11 to determine the offset voltage necessary to bring to zero this small current. At this point, the potential at terminals A and B equals the offset voltage. In order to protect the cell 11 from excessive current surges, the current limiter 46 effects an adjustment of the current flow returned to circuit common by applying a protective "bias" voltage to the input 47. The current limiter 46 is buffered from the current loop by buffer amplifier 44.

Figure 4:
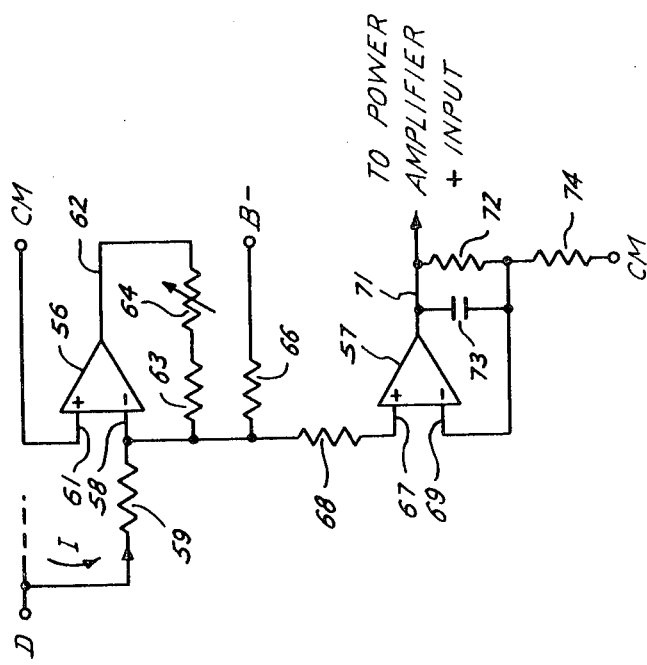
FIG. 4 is a schematic of a current limiter employed with the current source of FIG. 1.

In FIG. 4, the current limiter 46 comprises differential input amplifier 56 and 57. The amplifier 56 has a first input 58 connected through a resistance 59 to the output of buffer amplifier 44 and the other input 61 is at circuit common. The output 62 of the amplifier 56 connects in a feedback loop containing fixed and variable resistances 63 and 64, respectively. A current derived from $V_D'$ proportional to I passes through a resistor 59 to input 58 serving as the summing point. The inverting amplifier 56 holds input 58 at circuit common. The resistance 64 adjustment establishes the current I level at which amplifier 56 saturates. At current I less than maximum value, bidirectional, amplifier 56 holds input 58 at very near circuit common. When amplifier 56 is saturated, input 58 moves voltagewise from circuit common. Resistance 66 provides a current into summing point at input 58 which causes amplifier 56 to effectively saturate at some magnitudes of current I maximum for both directions of I maximum. The amplifier 57 connects with input 67 through a resistor 68 to the input 58 of the amplifier 56. The input 69 of the amplifier 57 connects to its output 71 through a feedback resistor 72 and shunting capacitor 73. The input 69 also connects through a resistance 74 to circuit common. The output 71 connects to the input 47 of the power amplifier 42 and through the voltage divider resistance 49 to circuit common. The amplifier 57 becomes active only when amplifier 56 reaches saturation. The power amplifier 42 is limited to that current output which is necessary to saturate amplifier 56 and this function is selected by resistors 63 and 64.

Returning now to FIG. 1, the linear sweep voltage $V_y'$ applied to the input 37 of the error signal amplifier 19 is obtained from a voltage sweep generator 81. The voltage sweep generator 81 has one output 82 at circuit common and a second output 83 connects to the input 37 of error signal amplifier 19. The input 37 is shunted to circuit common through a resistor 84. The resistor 84 is part of a common mode rejection network which also usually has the same effect upon current flows to circuit common as the resistor 45 associated with the power amplifier 42. The voltage sweep generator 81 in a preferred embodiment produces a triangular wave sweep voltage which, as illustrated diagrammatically, ramps linearly between voltage magnitudes $V_1$, $V_2$. At any particular instant, this triangular sweep voltage has a magnitude and rate of change which may be indicated by $V_y'$.

The voltage sweep generator 81 is adjustable as to both magnitudes and polarity of $V_1$ and $V_2$, and also in the rate of sweep. Further, the voltage sweep generator 81 can be adjusted as to sweep only from voltage $V_2$ to $V_1$, or $V_1$ to $V_2$, or any portion thereof, or to sweep continuously between these two values over any practical time limit. For example, sweep rate may be the completion of one full triangular wave in 24 hours or in 10 minutes. Irrespective of the sweeping rate, the output of the voltage sweep generator 81 is linear.

In particular, the voltage sweep generator 81 of the present invention can be arranged to have voltage sweep rate limits between 0.01 volts per hour to 100.0 volts per hour; it can hold any particular set voltage $V_y'$; or it can sweep continuously between the voltage limits $V_1$ and $V_2$, or from zero to either one or the other of these voltage magnitudes. Thus, the voltage sweep generator 81 can produce a linear sweep voltage signal $V_y'$ from a first magnitude $V_1$ to a second magnitude $V_2$, and preferably it provides a triangular wave sweeping voltage signal.

Figure 7:
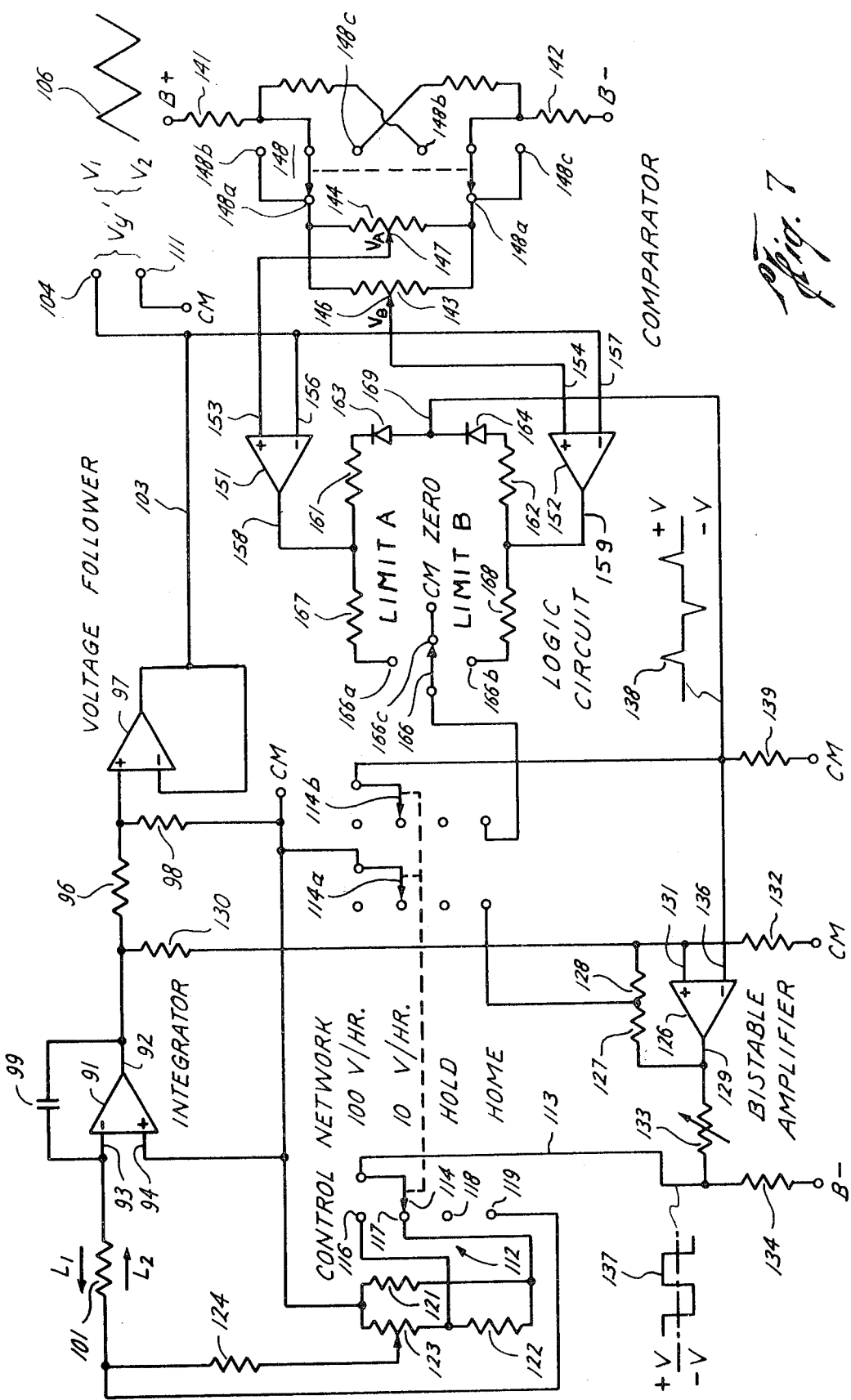
FIG. 7 is a schematic of the voltage sweep generator employed with the dynamic analyzer of the present invention.

Referring now to FIG. 7, the voltage sweep generator 81 is shown in circuitry detail. The generator 81 includes an integrator having an output circuit carrying the linear sweep voltage signal produced in response to a control current signal. A control network provides the control current signal upon receipt of a control signal voltage of fixed magnitude and positive or negative in polarity. A sweep reference voltage source provides first and second reference voltages. The linear sweep signal is correlated to the reference voltages in a comparator which generates switching signals at the sweep signal reaching each of the reference voltages. The switching signals are applied to a bistable amplifier which produces the control signal voltage of fixed magnitude but alternates in positive and negative polarity. The polarity of the control signal voltage determines whether the linear sweep voltage ramps up or down voltagewise.

More particularly, and integrator 91 receives a current control signal and provides responsively in an output circuit 92 a linear sweep voltage signal. For this purpose, the integrator 91 can be a differential input amplifier having the usual connections with the power supply 28, a first input 93 receives the control current signal, and a second input 94 is at circuit common. The output 92 connects through voltage dividing resistors 96 and 98 to a voltage follower 97. The capacitor 99 connects between the input 93 and output 92 for providing the integrating function. The input 94 connects to circuit common. As the potential at input 93 tends to change through the flow of current through resistor 101 into the capacitor 99, the output 92 swings voltagewise to hold input 93 at circuit common. If the current at the input 93 is of uniform magnitude, the voltage change at the output 92 is a linear function. For example, the control current signal flowing through resistance 101 to the input 93 is indicated by $i_2$. As this current charges the capacitor 99, the output 92 changes in a negative direction with a linear function. Conversely, a current flowing from input 93 through the protective resistor 101 is indicated by $i_1$ and produces a positive linear voltage change at the output 92. The conductor 103 from the voltage follower 97 is applied to terminal 104 and by suitable connection to the input 37 of the error signal amplifier 19. The terminal 111 of the voltage sweep generator 81 is at circuit common. The terminals 104 and 111 carry the linear sweep voltage $V_y'$ represented as triangular wave 106 which ramps between voltage magnitudes $V_1$ and $V_2$. The directional current flow of the control current signal $i_1$ or $i_2$ in the resistor 101 determines whether the linear sweep voltage $V_y'$ is increasing or decreasing in magnitude. Therefore, the control current signal is derived from a relatively stable source and, in the present voltage sweep generator 81, a control network 112 is employed for this purpose.

The control network 112 is comprised of a conductor 113 carrying a finite positive or negative control signal voltage magnitude. The source of this control signal voltage will be described hereinafter. The control signal voltage is applied through movable switch segment 114 to a plurality of contacts 116, 117, 118 and 119. These contacts are connected into a resistance network formed of fixed resistors 121 and 122, a variable resistance 123, and connected through a series resistance 124 to the resistor 101 at input 93 of the integrator 91. These network resistances in the control network 112 provide a stable and selectable impedance divider whereby the positive or negative control signal voltage is converted into a finite control current signal which flows through the resistance 101. The several switch controls provide for selecting the rate of change of the linear sweep voltage. For example, the switch at contact 116 selects a sweep rate of 0 to 100 volts per hour; at contact 117, a sweep rate of 0 to 10 volts per hour; and contacts 118 and 119 provide functions in the analyzer, which will be described in greater detail hereafter, of "Hold" at a selected $V_y'$ and "Home" to $V_1$ or $V_2$. Sweep rates at contacts 116 and 117 are determined by variable resistor 123.

The control signal voltage applied to the control network 112 may be either positive or negative in polarity to determine, respectively, whether the linear sweep voltage is increasing or decreasing in magnitude. In accordance with the preferred embodiment of this invention, the control signal voltage is made alternately positive and negative in polarity so as to produce a triangular linear sweep voltage signal 106 in the output 92 of the integrator 91. The control network 112 in conjunction with the control voltage signal provides for regulating the magnitude and direction of current flow of the control current signal through the resistor 101, thereby determining the rate of increasing or decreasing of voltage in the linear sweep voltage signal in output 92.

The control voltage signal in the conductor 113 is produced in a novel fashion with alternate changes in polarity but of a preset fixed and stable magnitude. For example, the control signal voltage may be a positive or a negative 10 volts. The control signal voltage is provided by a bistable amplifier 126 which has the usual connections to the power supply 28. Preferably, the bistable amplifier 126 is a differential input amplifier having a component gain of about 50,000. However, a positive feedback circuit of resistors 127 and 128 between its output 129 and first input 131 provides the feedback necessary to obtain a bistable operation. The voltage divider of resistors 130 and 132 provides a portion of the integrator output 92 voltage at the input 131 of the bistable amplifier 126. The bistable amplifier 126 switches from saturation from one polarity voltage limit to the other polarity voltage limit when the voltage difference becomes zero between inputs 131 and 136. This operation results from positive feedback to input 131 from the output 129 and the high internal gain of amplifier 126. The resistors 133 and 134 compensate for any difference in the saturation characteristic of the bistable amplifier 126 about zero output voltage. The bistable amplifier 126, when correctly adjusted, causes the control signal voltage to swing to and remain at one of two equal magnitudes of voltage but opposite in polarity. This function is indicated by the graphic display 137 as shifting between +V and −V about a zero voltage magnitude.

The bistable amplifier 126 is switched from one to the other polarity control voltage signal by successive switching signals 138 applied to input 136. The input 136 connects to circuit common by a resistor 139 and receives the switching signal shown in the graphic display 138. Each successive switching signal upon the input 136 causes the output 129 to move from one to the other polarity of the control signal voltage. The bistable amplifier 126 switches its output 129 between absolute and stable finite magnitudes equal but opposite in polarity upon receipt of successive switching signals at the input 136 irrespective of the magnitudes of such switching signal.

The switching signals can be of opposite polarity as indicated by the diagrammatic representation 138. The switching signals may be of any duration or of uniform or nonumiform magnitude as long as they are sufficient in both characteristics of polarity and voltage magnitude to cause the inputs 131 and 136 of the amplifier 126 to become equal potentialwise. With the proper switching signal, the positive feedback about the amplifier 126 causes the output 129 to shift so that the control signal voltage is at one of the limits +V and −V set by the variable resistance 133. Immediately after shifting directionally through zero, the positive feedback of the bistable amplifier 126 holds the output 129 to maintain such voltage limit, +V or −V, until the next succeeding switching signal of opposite polarity. For example, the first switching signal in the diagram 138 is indicated as positive going. This corresponds to the control signal voltage in the diagram 137 being switched in a negative direction to the limit of negative polarity (−V). The next succeeding switching signal is negative going and causes the control signal voltage 137 to be switched to the limit of positive polarity, +V. The control signal voltage remains at each such magnitude and polarity until the next succeeding switching signal of opposite polarity.

In the voltage sweep generator 81, the switching signals occur in exact timing to the linear sweep voltage between terminals 104 and 111 reaching the magnitudes $V_1$ and $V_2$, respectively. As the triangular wave sweep voltage reaches the magnitude $V_1$, the switching signal may be of negative polarity, and upon reaching the magnitude $V_2$ may be of positive polarity. For this purpose, the voltage sweep generator 81 includes a comparator for determining when the triangular wave sweep voltage reaches one of the magnitudes $V_1$ or $V_2$ and produces the switching signals at the precise timing when these values are reached. For this purpose, the comparator samples the linear sweep voltage signal at the terminal 104 and compares this sweep voltage signal with first and second reference voltages $V_A$ and $V_B$, respectively, defining particular magnitudes of the sweep voltage limits $V_1$ and $V_2$ as indicated in the graphic display 106. Precisely as each of the sweep voltage magnitudes, $V_1$ and $V_2$ are reached in reference respectively to the first and second reference voltages, successive switching signals occur with opposite polarities.

The first and second reference voltages $V_A$ and $V_B$ are obtained from any suitable source such as a resistance divider network connected to the power supply 28. This resistance network includes dropping resistors 141 and 142 which connect across paralleled potentiometers 143 and 144. The value of these resistances are so arranged that the first and second references voltages $V_A$ and $V_B$ (relative to circuit common) appear at the movable contacts 146 and 147 on these potentiometers. With the arrangement shown, $V_1$ and $V_2$ may be of any magnitude and any polarity relative to one another. For example, $V_1$ and $V_2$ may be of equal magnitude but opposite in polarity. Alternatively, $V_1$ and $V_2$ may be both positive in value, but of different magnitudes. Alternatively, $V_1$ and $V_2$ may be negative in value and of different magnitudes. Also, $V_A$ and $V_B$ may be taken at either one of the movable contacts 146 and 147. In order to provide an instant reversal of sweep direction, the resistor network is interconnected through a momentary double-pole, triple-throw switch 148. The switch 148 at terminal 148a is the normal switch position where both reference voltages $V_A$ and $V_B$ are available at the movable contacts 146 and 147. Placing the switch 148 into the position 148b substitutes new reference voltage limits that are both to one side of $V_y'$ voltagewise. Moving the switch 148 to the position 148c substitutes new reference voltage limits that are both to the other side of $V_y'$ voltagewise. Thus, positions 148b and 148c permit sweep direction reversal. Returning the switch to position 148a returns the voltage sweep limits to $V_A$ and $V_B$. If $V_y'$ resides between $V_A$ and $V_B$, the sweep direction will not be reversed. Thus, there is a feature of selected sweep direction reversal in the present voltage sweep generator without disturbing the voltage sweep limits $V_1$ and $V_2$.

The comparator has differential input amplifiers 151 and 152 with their inputs receiving the first and second reference voltages and the sweep voltage signal at the terminal 104. The amplifiers 151 and 152 should have relatively high component gains of approximately 50,000 and are adapted with zero input voltage to move from one saturated state to the other saturated state of opposite polarity and then returns into the first saturated state. With this arrangement, high sensitivity to small potential differences between the voltage limits $V_1$ and $V_2$ of the linear sweep voltage signal can be readily compared to the first and second reference voltages. The amplifier 151 has a first input 153 connected to the movable contact 147 to receive the first reference voltage. The amplifier 152 has an input 154 connected to the movable contact 146 to receive the second reference voltage. The remaining inputs 156 and 157 of these amplifiers are connected together and to the terminal 104 to receive the linear sweep voltage signal for comparison purposes. As the sweep voltage magnitudes $V_1$ and $V_2$ are approached closely by the linear sweep voltage at the terminal 104, the voltages between the inputs of one of the amplifiers 151 and 152 approach a zero voltage signal differential and this amplifier's output swings from one saturated state to the opposite polarity saturated state. The outputs 158 or 159 of the amplifiers 151 and 152, respectively, move suddenly voltagewise to preset magnitudes that are determined by an output resistor-diode network. As a result, the active amplifier reverses state and returns to its original saturated state. For this purpose, the outputs 158 and 159 connect through series resistors 161 and 162, and rectifiers 163 and 164, to a conductor 169 which connects with the input 136 of the bistable amplifier 126. The rectifiers 163 and 164 are series connected between the outputs 158 and 159. When the voltage magnitude limits $V_1$ or $V_2$ for the linear sweep voltage signal reside between the first or second reference voltages $V_A$ and $V_B$, the amplifiers 151 and 152 have their outputs 158 and 159 shifted voltagewise in such a manner that the rectifiers 163 and 164 are both biased into a conducting or nonconducting state. When the linear sweep voltage signal at the terminal 104 reaches one of the first or second voltage magnitudes $V_1$ or $V_2$, one of the rectifiers is biased to a conducting state and the other of the rectifiers is biased into a nonconducting state whereby a voltage signal produces the switching signal on conductor 169. These switching signals alternate in polarity, but each of them occurs precisely as the linear sweep voltage reaches one of the first or second voltage magnitudes $V_1$ or $V_2$. The resistances and rectifiers in the outputs of the comparator amplifiers 151 and 152 are a logic circuit for generating the switching signals of alternate polarity in succession.

The comparator with the switch 114 in the Home position 119 may be employed for causing the linear sweep voltage signal to go to either of reference voltage sweep limits $V_A$ or $V_B$. For this purpose, a switch 166 is employed in a single-pole, triple-throw function. The switch in position 166a connects through a load resistor 167 to the output 158, and in position 166b connects through a resistor 168 to the output 159, and in central position 166c connects to circuit common. In the normal operating position 166c, the voltage sweep generator 81 can be zeroed under static conditions at the Hold position of switch 114 at contact 118. In the position 166a, the reference sweep voltage $V_A$ will appear at terminal 104. In position 166b, the reference sweep voltage $V_B$ appears at the terminal 104. In position 166c, zero voltage appears at terminal 104. During normal operation of the instrument with the switch 114 at the contacts 116 or 117, the switch 166 is inactive. However, the switch 114 at the contact 119 places the sweep voltage generator 81 into the Home function. Also, switch 114a in Home removes the positive feedback from amplifier 126 by shorting the juncture of resistors 127 and 128 to circuit common. The switch 114 at contact 118 Hold will hold the sweep voltage signal at its instant magnitude $V_y'$. The switch 114 also has sections 114a and 114b which function exactly as previously described. In the Home position, the switch 114b connects to the switch 166 and the conductor 169, and with input 136 of the bistable amplifier 126.

The comparator in the present voltage sweep generator 81 is of great advantage in providing several unique sweep generator functions which have been heretofore described and can be used separate and apart from the dynamic analyzer. The control current signal from control network 112 that is applied to the integrator 91 is always stable and of a preset magnitude even though it undergoes alternate directional changes in flow through the resistor 101. The resistor 139 returns the logic circuit to circuit common.

In the present voltage sweep generator 81, placing the switch 114 into the Hold function terminates the application of the control signal voltage on the conductor 113 into the control network 112. At such time, the integrator 91 ceases to receive a control signal current through the resistor 101 and integration stops within capacitor 99. As a result, the linear sweep voltage $V_y'$ is held at the potential last achieved before the switch 114 was moved into the Hold position. Thus, a fixed sweep voltage $V_y'$ is available at terminal 104 for reference setting or for other purposes.

Referring again to FIG. 1, the linear sweep voltage from the voltage sweep generator 81 is applied to the input 37 of the error signal amplifier. As a result, the power amplifier 42 produces a current flow between terminals C and D, and concomitantly between electrodes 13 and 14 of the external system, for inducing a polarizing potential $V_y$ between electrodes 12 and 13, which potential $V_y$ appears at terminals A and B and across inputs 23 and 24 of the isolation amplifier 17. As previously mentioned, the potential at the inputs of the isolation amplifier 17 can be precisely the linear sweep voltage. If desired, the polarization potential at inputs 23 and 24 can be the linear sweep voltage $V_y'$ summed with an offset voltage from the offset voltage source 21. In other words, the polarization potential at teminals A and B "tracks" the linear sweep voltage, and any offset voltage. The current flow I between the terminals C and D in the external system may be a logarithmic function of the polarization potential $V_y$ present at the terminals A and B. Thus, if the voltage sweep generator 81 produces a linear sweep voltage signal, the current I will have a logarithmic function in time. A readout comparison between a logarithmic current and a linear sweep voltage signal produces great difficulties not only in a display or correlation, but also in determining corresponding multidecade ranging of extended time of current and voltage magnitudes in calibration and for other purposes.

The present dynamic analyzer employs a unique method of correlating and calibrating the log current and the linear sweep voltage signal functions. For this purpose, a bipolar log converter 71 senses this output current I between terminals C and D and produces a bipolar potential signal $\pm V = \log I$. The potential signal has a polarity representative of the flow direction of the output current. Also, the potential signal has a magnitude representative of the logarithm of the magnitude of the output current. Furthermore, the potential signal changes polarity upon a change in the flow direction of the output current. The bipolar log converter 171 has one input connected to circuit common and a current sensing input 174 connected to a range setting resistance network 173 and a current dividing resistor 176. Thus, the current signal at the input 174 is proportional in a fixed ratio to the current I flowing between terminals C and D.

In FIG. 5, there is illustrated circuit forming the bipolar log converter 171. The bipolar log converter 171 includes a differential input amplifier 181 having one input 182 connected to the input 172. The other input 183 connects through a resistance 184 to circuit common. As a result, the current signal I appears at the input 182 (current summing point) of the amplifier 181. The amplifier 181 has an output 186 which moves voltagewise in specific correlation to the current signal I at the input 182. Rectifiers are connected in series with their common puncture connecting to the input 182 of the amplifier 181 and with their other terminals connecting across a voltage biasing network for placing the rectifiers into a conducting state. These rectifiers may take any suitable configuration for producing a nonlinear potential-to-current conversion. For example, a current flowing through either of such rectifiers produces a linear signal voltage corresponding to the logarithm of the current magnitude. An output circuit connects in series across the rectifiers and their common junction is connected to the output 186 of amplifier 181 forming a feedback loop wherein the signal current passes through one rectifier to the output 186, thereby creating a potential signal in the output circuit. This potential is employed for providing the potential signal representing the logarithm of current I.

Many types of such rectifiers are known, but for purposes of this present invention, it is preferred that the rectifiers be provided by transistors having collector-emitter junctions arranged to perform the rectifier function. Preferably for this purpose, a pair of rectifiers are formed by PNP transistor 187 and NPN transistor 188 with their bases connected together and to circuit common, and with resistor 184 in series with input 183 of amplifier 181. The collectors of these transistors are connected together and to the input 182 of the amplifier 181. The emitters 189 and 191 connect to a voltage biasing network which provides a small but steady state current flow from any suitable source such as the B+ and B− terminals of the power supply 28 for biasing the transistors 187 and 188 into a conducting state, thereby producing the mentioned nonlinear potential-current conversion. More particularly, the emitter 189 connects through a resistor 192 to the B+ terminal of the power supply 28. The emitter 191 connects through a resistor 193 to the B− terminal of the power supply 28. The voltage biasing network may take any operable form such as a pair of batteries series connected with the rectifiers and thereby forming a voltage bridge. Preferably the voltage bridge has the following forms. A pair of diodes 194 and 196 are connected in series between the emitters 189 and 191 and the resistors 192 and 193. The junction 197 between the diodes 194 and 196 connects through a current-limiting resistor 198 to the outut 186 of the amplifier 181. The voltage biasing network may include a four-arm bridge comprising resistors 201 and 202 and resistors 203 and 204 in series with the first mentioned resistors. It is preferred to employ the resistors in such a bridge in order to provide a well-controlled current divider so that the current which places the transistors into conduction is only a small portion of the current (1–2 nanoamperes) which flows through this four-arm bridge and the smallest value of current I. More particularly, it is preferred that the current flow through the collector-emitter junctions of the transistors relative to the current flows through the four-arm resistance bridge and current I is in a ratio of at least 1 to 1,000 and preferably a higher ratio of 1 to 100,000 is employed for greater stability. Thus, a small biasing voltage is developed across each transistor.

The transistors 187 and 188 are arranged with their bases at circuit common so that no significant current can flow between their base connections and the collectors and emitters. As a result, all signal current must flow through the collector-emitter junctions in a rectifier function since the transistors are in a forward conducting state. The current I flow through the collector-emitter junctions produces a conversion into a corresponding linear potential signal V which is the logarithm of the magnitude of current I. More particularly, current flows about the summing point at the input 182 and is matched by equal counter current flows to the summing point from the feedback connection to the eollectors of the transistors 187 and 188. The output 186 of the amplifier 181 shifts voltagewise in response to the current I appearing at the summing point of input 182. Point 197 moves responsively in voltage and an equal current flows between input 182 and the common collector connection of the transistors, through one of the collector-emitter junctions, is gated through one of the diodes 194 or 196 and flows through the resistor 198 to or from the output 186. The diodes 194 and 196 selectively gate the current signal I through one of the collector-emitter junctions in a feedback loop for conversion of this current signal, in a nonlinear manner, into a potential signal. The polarity of the potential signal is determined by which transistor 187 or 188 has conducted the current signal and is summed with the bias voltages across the conducting transistors. Only one transistor conducts current I at any time as the current in the feedback loop flows to and from the output 186 of the amplifier 181. Thus, the polarity of the linear potential signal created by current rectification at a collector-emitter junction of each transistor reflects the directional flow characteristic of the current I which passes between terminals C and D to the external system. As a result of the potential signal created at one of the transistors 187 or 188, the potential at point 197 between the resistors 192 and 193 shifts voltagewise. This potential signal summed with the biasing voltages developed across the transistors approaches zero as the current I nears zero during direction reversal. As a result, the potential signal V changes substantially linearly over this small range of current magnitudes each side of zero current. The resistor network 203 and 204 responsively produces at their juncture 205 a corresponding potential signal relative to circuit common. This potential signal corresponds in polarity to the current signal I at the collector-emitter junctions of the transistors 187 and 188. Thus, this linear potential signal at juncture 205 of the resistors 203 and 204 is correlated by magnitude and polarity in the relationship $\pm V = \log I$.

Obviously, the most optimum functioning of the transistors 187 and 188, the amplifier 181 and the other components of this log converter circuit, can require temperature correction. If such feature is desired, a voltage follower differential amplifier 209 can be employed for adjusting the potential signal in its output 213 to compensate for any gain errors induced by temperature variations. The amplifier 209 has a first input 208 connected to the juncture 205 of the resistance bridge. The other input 211 of the amplifier 209 connects through a resistor-capacitor feedback network 212 to the output 213. A variable resistance 214 connects between the input 211 and circuit common. The resistance 214 is selected with a temperature coefficient so as to adjust the gain of the amplifier 209 and thereby correct temperaturewise the potential signal at output 213. This potential signal at the output 213 is indicated at $\pm V = \log I$. Thus, the bipolar log converter 171 produces a bipolar conversion in the current I into a potential signal, and maintains the exact and precise relationship thereto irrespective of decades of change in the current I.

Internal temperature correction can be applied to the transistors 187 and 188, if desired. A complementary transistor can be mounted on each of the chips bearing the transistors 187 and 188. For example, a PNP transistor 216 is mounted on the chip with the transistor 187. A NPN transistor 217 is mounted on the chip with the transistor 188. The transistors 216 and 217 are connected with their collectors connected together and to the junction between the resistors 201 and 202. The emitters of the transistors 216 and 217 are connected emitter-emitter with transistors 187 and 188. The base of the transistor 216 connects to the junction between resistors 202 and 204. The base of the transistor 217 connects to the junction between resistors 201 and 203. Thus, the transistors 216 and 217 share common chips with the transistors 187 and 188. However, the transistors 216 and 217 are connected in reverse base signal to the junction of the first and third and second and fourth resistances of the bridge. As a result, the collector-emitter junctions of the transistors 216 and 217 provide a low impedance current path. A temperature change in any one of the collector-emitter junctions produces a corrective voltage in the other transistor on the same chip. As a result, no temperature-induced current variation can effect the nonlinear potential-to-current conversion at the collector-emitter junctions of transistors. The collector-emitter junctions of the transistors 216 and 217 provide a low impedance path for current compensation in the first and second resistances 201 or 202. The current compensates for any voltage shift in these resistances during the nonlinear potential-to-current conversion at the collector-emitter junctions of the transistors 187 and 188. The transistors 216 and 217 provide for temperature compensation in the low impedance arms of the bridge, which arms sustain a major part of current flow while limiting the amount of current flow placing the transistors 187 and 188 into a conducting state at their collector-emitter junctions. The transistors 216 and 217 provide an exacting current control for insuring a steady current flow through the transistors 187 and 188 irrespective of temperature changes internally within these transistors or levels of the current I.

The amplifier 181 has a capacitor 218 in its feedback circuit. This capacitor provides the amplifier 181 with an active filter in voltage-to-current application to insure absolute tracking between voltage swing at the output 186 relative to the current signal I appearing at the input 182. The amplifier 181 with this arrangement has excellent low current noise bypass relative to the current I flowing through the transistors 187 and 188. However, as the current I changes direction and the potential signal V at the output 213 of the voltage follower amplifier 209 passes through zero, a nonlinearity may occur at zero crossing under a high rate of change in the current I. This problem can be reduced by providing the bipolar log converter 171 with a capacitance cancellation system. For this purpose, an inverting amplifier 221 is connected with one input to circuit common, and the other input 222 to the output 186 of the amplifier 181. The amplifier 221 can be a conventional differential input type with a feedback loop formed of fixed resistances 215 and 223, and a voltage setting potentiometer 224. A coupling capacitor 226 connects the potentiometer 224 to the input 182 of the amplifier 181. The resistance in the feedback loop of the amplifier 221, and the ratio of the capacitor 226 to the compacitor 218, are selected so that the amplifier 221 saturates to remove the effect of capacitor 226 when output 186 swings voltagewise ±1 voltage. A rapid change at zero crossing in polarity of the potential signal at the output 186 of the amplifier 181 impresses a voltage across potentiometer 224. The amplifier 221 effectively removes the capacitive effect of the capacitors 218 and 226 during this interval. The amplifier 221 does not have any significant effect except during this interval on the amplifier 181. Thus, the capacitor 218 is made effectively of value to permit a uniform rate of change by action of amplifier 221. Other arrangements for providing a capacitance eliminator result may be employed. Alternatively, the current change may be compensated by changing the values of the capacitor 218 in the feedback circuit of the amplifier 181.

The bipolar log converter 171 operates in a continuous manner and converts the current I at the input 182 into a bipolar potential signal at the output 213. The current I can change through several decades, for example, four decades. The current may also change direction and continue to change for an additional four decades in a reverse flow direction. The log converter 171 of the present invention produces a corresponding bipolar potential signal at the output 213 which is linear in function and precisely tracks the particular current magnitudes upon which logarithmic conversion has occurred. Thus, the potential signal at terminal 213 can be applied to a linear scale recorder. A semilog cycle scale permits a direct readout of the original current I even with zero crossing. The problems of unipolar log conversion and decade-spanning ranges of conversion current are avoided by use of the novel bipolar log converter employed in the present dynamic analyzer. Therefore, the log converter can be used in other applications for the conversion $\pm V = \log I$.

The bipolar log converter 171 may be employed with a readout means having semilog cycle scales above and below a zero center scale setting. However, it is preferred for continual recording and direct display purposes of comparison of log I to the linear sweep voltage applied to the dynamic analyzer to employ another unique element of the present invention. This element is an absolute value circuit 231 illustrated in FIG. 1 relative to the remaining elements of the dynamic analyzer. The absolute value circuit 231 receives the potential signal, $\pm V = \log I$, and converts this bipolar potential signal into a unipolar potential, $V_x = \log I$, which also has zero crossing capabilities without distortion. More particularly, the absolute value circuit 231 receives the potential signal from output 213 and produces a single polarity voltage (corresponding to all potential signals irrespective to whether they are positive or negative) and provides such single potential signal with absolute linearity. As a result, the unipolar potential signal can be graphically displayed on the same semilog cycle graph scale wherein zero log current I is at one extreme margin. The significance of such display result may be appreciated in FIG. 1 by the readout device 232 which provides for comparison of the linear sweep voltage signal $V_y'$ with the potential signal $V = \log I$. It is not necessary for the absolute value circuit 231 to be employed, but it is preferred to do so. In such arrangement, the voltage output of the absolute value circuit 231 is applied to a suitable readout device 232 which may be a X-Y plotter. For example, the absolute value circuit output $V = \log I$ may be the X axis and the linear sweep voltage signal $V_y'$ may be the Y axis on the X-Y plotter. The X-Y plotter has a linear scale for the Y axis which is in voltage per scale division. The voltage $V_y'$ has a positive and negative value to the left and right margins with a center zero potential position. Along the X axis, the lower extremity represents zero current I and proceeds upwardly in log cycle scale for a selected number of decades, which may be for example five decades.

The readout device 232 contains a graphic curve 233 which is representative of an actual recording produced by the dynamic analyzer of the present invention where the triangular sweep voltage signal $V_y'$ was employed between two voltage magnitudes, one being positive, the other being negative and passing through zero. Consider the recording to begin at the point 234 as a sweeping voltage signal (anodic) decrease from a negative value towards zero along the curve portion 236. Whenever the sweep voltage signal passes through zero at the point 237, the voltage signal reverses and the curve portion 238 is followed until the point 239 is reached. Again, the sweep voltage signal (cathodic) begins to change direction and the curve portion 241 is followed until point 242 is reached at the other magnitude of sweeping voltage signal. Then, the sweeping voltage signal begins to return to its original value along curve portion 243 of the curve display 233. During this triangular wave sweep, it will be apparent that the linear sweep voltage signal passes twice through zero and the current I flowing between the terminals C and D also passes through zero twice. However, all of the display is shown upwardly from zero along the X axis. This log current function $V = \log I$ may be read directly on a semilog scale, and also in direct comparison to any value of sweep voltage signal $V_y'$ along the Y axis. Such graphic displays of electrochemical and electroanalytic phenomenon cannot be obtained in any known prior instruments.

Figure 3:
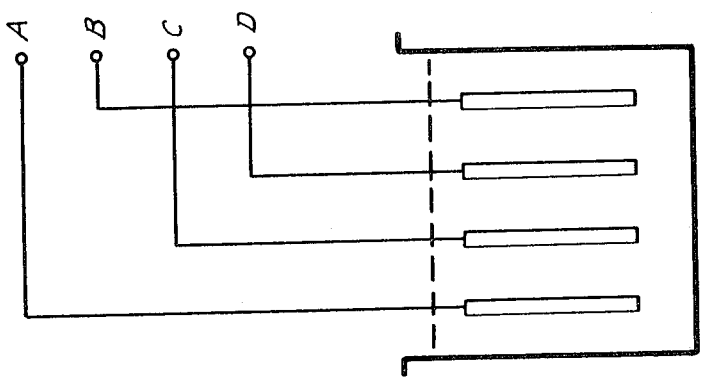
FIG. 3 is a four-electrode electrochemical cell which may be employed for measurement of conductivity of the liquid in the cell.

The curve 233 reflects the anodic phenomena in portions 236 and 243 and cathodic phenomena in curve portions 241 and 238. Anodic conditions require a current flow between terminals C and D in one direction, and cathodic conditions require current flow in the opposite direction at these terminals. The present dynamic analyzer acting upon a three electrode cell as shown in FIG. 3 can produce such actual recording in curve 233 without resetting during continuous operation. It will produce such recording during relatively slow or very fast sweep rates in the linear sweep voltage signals provided by the voltage sweep generator 81.

The curve 233 indicates to the electrochemist the phenomena occurring by corrosion about the test electrode 13. For any given linear sweep voltage signals, the magnitude of current I flowing between terminals C and D can be correlated to the corrosion occurring (both anodically and cathodically) over long or short periods of time, and in completely unattended operation. This analysis result remains whether the linear sweep voltage $V_y'$ passes through zero voltage, or where all sweep voltage is positive or negative in polarity. Additionally, the readout device 232 operates unattended, can span any number of decades of change in the current I and will retrace successively the curve 233.

Referring to FIG. 6, the absolute value circuit 231 is shown in detail. The absolute value circuit includes a unity gain amplifier 251 and a voltage follower amplifier 252, both of which may be differential input amplifiers connected to the power supply 28. The amplifier 251 has one input at circuit common and another input 253 connected into an input circuit 254 which receives the potential signal $\pm V = \log I$ from the bipolar log converter 171 at output 213. Both amplifiers operate in an inverting mode. A potentiometer 256 connects between first and second resistances 257 and 258. The resistor 257 connect to the input 254 and resistor 266. The resistor 258 is connected through a diode 261 to the output 262 of the amplifier 251. A feedback loop comprised of a resistor 263 and diode 264 connects between the input 253 and the output 262 of the amplifier 251. The diode 261 connects through third and fourth resistors 266 and 267 to the input 254 and to the amplifier 252 at its input 268. The junction 269 of the resistors 266 and 267 is a current summing point. The input 268 of the amplifier 252 connects to B+ of the power supply 28 through a potentiometer 271. The amplifier 252 is a voltage follower having a feedback loop comprised of resistor 272 and variable resistor 273. The output to the readout device 232 is taken between terminal 274 connected to the variable arm of the potentiometer 273 and terminal 276 connected to circuit common. Adjustment of the potentiometer 271 provides for precisely setting the decade range of $V = \log I$ relative to the actual voltage input to the X axis of the readout device 232 for a given current decade readout. The circuitry of the dynamic analyzer is arranged that the readout device 232 has a linear input voltage relationship along the X axis. This relationship is precisely set at potentiometer 273 to the decades through which the log I changes as represented by the potential signal $\pm V = \log I$ at output 213 of the bipolar log converter 171. In this manner, the semilog readout along the X axis provides the magnitude of current I for a given sweep voltage signal $V_y'$.

In the absolute value circuit of FIG. 6, the resistors 257, 258, 266 and 267, are arranged so that the amplifier 251 operates in only one DC polarity by adjustment of the potentiometer 256. When the potential signal is positive +V, the amplifier 251 has unity gain and the output 262 is negative in polarity and point 259 is exactly of the same magnitude as the potential signal but negative in polarity. At this condition, current can flow through the diode 261 to the summing point 259 at twice the magnitude of the current through resistor 263 but opposite in direction. The voltage follower amplifier 252 now produces a corresponding positive potential signal at the terminal 274 for application to the readout device 232. When the potential signal is negative in polarity −V, the unity gain amplifier 251 is inactive since point 259 remains at zero potential. Current can flow to the summing point 269 only from input 254. As a result, the voltage follower amplifier 252 produces a like magnitude positive potential signal at the output 274 for application to the readout device 232. Either of the input signals, irrespective of whether they are positive or negative in polarity, produces identical positive potential signals $V_x$ at the output 274 of the absolute value circuit 231. The resistance network is adjusted to provide this result so that the relationship between current I and potential signal $V_x$ are maintained through several decades of change in the current signal. In general, the resistors 257 and 266 have equal values, and the resistor 267 has a value one-half the magnitude of either of the resistors 257 and 266. This particular arrangement provides for precise conversion of a positive or negative potential signal to an identical positive potential signal of equal magnitude and in exact calibration to the required decades corresponding to the bidirectional current flows applied to the bipolar log converter 171. Thus, the dynamic analyzer maintains exact calibration and relationships between currents of logarithmic characteristic and linear sweep voltage throughout any desired selected operating range by adjustment of circuit values.

The present dynamic analyzer has many applications in the field of electrochemistry and electroanalytical instrumentation. The present invention produces by selected programming, or manual operation, both potentiodynamic and potentiostatic measurements in any suitable external system such as an electrochemical cell or corrosion test cell. In a potentiodynamic mode the present dynamic analyzer causes a current flow in the cell 11 between terminals C and D such that the induced potential between terminals A and B follow a preselected linear sweep voltage rate between two voltage limits. The sweep rate and the voltage limits may be programmed individually by the operator. In the potentiostatic mode, the present dynamic analyzer causes a current flow in the external system such that the induced polarization potential is held constant at a value determined by the operator. Anodic and cathodic currents can be continuously determined and recorded as a permanent readout for a log current function over several decades of change. In one embodiment of the present invention, the log current function could be recorded over a range of five decades with a sweep voltage signal ranging eight volts. Sweep rates between 10 millivolts per hour and 100 volts per hour were readily obtained. Zero crossing characteristics produced by the bipolar log converter are substantially free of distortion down within a few nanoamperes of current.

The present dynamic analyzer is applicable to the study of electrochemical cell reactions, electrode reactions, corrosion rates of metals, inhibitor studies in both rates and mechanisms, evaluation of alloys for corrosion characteristics and other electroanalytical and electrochemical processes for use in corrosion research and engineering fields. It is the first instrument of this type which is accurate, can produce rapid polarization measurement by programmed operation with a minimum of operator attention.

Various modifications and alterations in the bipolar log converter are apparent to those skilled in the art from the foregoing description which do not depart from the spirit of the invention. For this reason, these changes in elements and functioning are desired to be included within the scope of the present invention. The appended claims define the present invention and the foregoing description is to be employed for setting forth the specific embodiments as illustrative in nature.

What is claimed is:
1. A bipolar log converter comprising
  a. a differential input amplifier having one input receiving a bidirectional current signal and another input connected to circuit common of a DC power supply means, and an output providing a voltage representative of said current signal;
  b. a pair of transistors comprising PNP and NPN types with their bases at circuit common and their collectors connected to said input of said differential input amplifier receiving the current signal;
  c. a voltage biasing network for providing a current flow from said DC power supply means through the collector-emitter junctions of said transistors thereby placing said transistors into a conducting condition for nonlinear potential-current conversion;
  d. a pair of diodes series connected between the emitters of said transistors and at the common junction of said diodes connected to the output of said differential input amplifier thereby forming a feedback loop wherein said current signal is passed through one of said collector-emitter junctions and a diode to the output of said differential input amplifier for creating a potential; and
  e. means for providing from said potential a continuous potential signal representing the current signal whereby said potential signal has a polarity representative of the flow direction of the current signal and a magnitude representative of the logarithm of the current signal, and said potential signal changing polarity upon a change in flow direction of the current signal.

2. The bipolar log converter of claim 1 wherein the voltage biasing network includes a pair of shunting resistances in parallel with said transistors whereby the current flows through the collector-emitter junctions and through said shunting resistances are in a ratio of at least 1 to 1,000 so that the current flow through the collector-emitter junction remains substantially constant.

3. The bipolar log converter of claim 2 wherein the ratio of current flows is at least 1 to 100,000.

4. The bipolar log converter of claim 2 wherein a resistance bridge is connected between said emitters of said transistors to produce a potential signal corresponding to said potential created at one of said collector-emitter junctions.

5. The bipolar log converter of claim 4 wherein a voltage follower differential amplifier receives said potential signal at one input and the other input is connected through a temperature compensating resistance to circuit common and in a feedback loop to the output thereof whereby the voltage output signal at said output is representative of the current signal and corrected for temperature errors in said resistance bridge.

6. The bipolar long converter of claim 1 wherein the voltage biasing network includes a four-arm resistance bridge, first and second resistances in parallel with said transistors, and third and fourth resistances in parallel with said first and second resistances, the current flows through said collector-emitter junctions and through said first and second resistances being in a ratio of at least 1 to 1,000 whereby the current flow through said collector-emitter junctions remains substantially constant, said third and fourth resistances forming a resistance bridge to produce at the junction of said third and fourth resistances a potential signal corresponding to said potential created at one of said collector-emitter junctions.

7. The bipolar log converter of claim 6 wherein a voltage follower differential amplifier receives said output voltage at one input and the other input connected through a tempeature compensating resistance to circuit common and in a feedback loop to the output thereof whereby the potential signal at said output is representative of the current signal and corrected for temperature errors in said resistance bridge before applying said potential signal to said means for providing an output thereof.

8. The bipolar log converter of claim 6 wherein a second pair of transistors comprising PNP and NPN types are connected emitter-emitter with like types mounted on a common chip with the first mentioned pair of transistors, and said second pair of transistors connected with their collectors to the junction of said first and second resistances and with their bases connected in reverse phase to the junctions of said first and third, and second and fourth resistances whereby a temperature change in one of the collector-emitter junctions produces an out-of-phase current through one of said first and second resistances of said bridge thereby compensating for a temperature induced-current variation in the nonlinear potential-current conversion at the collector-emitter junctions.

9. A bipolar log converter comprising:
   a. a differential input amplifier having one input receiving a bidirectional current signal and another input connected to circuit common of a DC power supply means, and an output providing a voltage representative of said current signal;
   b. a pair of transistors comprising PNP and NPN types with their bases at circuit common and their collectors connected to said input of said differential input amplifier receiving the current signal;
   c. a voltage biasing network connected between positive and negative terminals of said DC power supply means and said transistors having their emitters connected between said positive and negative terminals whereby a current flow between the collector-emitter junctions places said transistors into a conducting condition for nonlinear potential-current conversion;
   d. a pair of diodes series connected between said emitters of said transistors and the common junction between said diodes being connected to the output of said differential input amplifier forming a feedback loop current, and said diodes selectively gating said current signal through one of said collector-emitter junctions into said feedback loop for conversion of said current signal into a potential whose polarity is determined by which transistor has conducted said current signal;
   e. a resistance bridge connected between said emitters of said transistors producing a potential signal corresponding in polarity to the potential produced by one of the collector-emitter junctions; and
   f. means for providing a scaler indicia of said potential signal from said resistance bridge which indicia is the logarithm of the magnitude of said current signal applied to said differential input amplifier.

10. The bipolar log converter of claim 9 wherein the voltage biasing network includes a four-arm resistance bridge, first and second resistances in parallel with the emitters of said transistors, and third and fourth resistances in parallel with said first and second resistances, current control means associated with said first and second resistances providing a low impedance current path in parallel with the collector-emitter junctions of said transistors whereby the current flows through the collector-emitter junctions and through the low impedance current path of the first and second resistances is in a ratio of at least 1 to 1,000 so that the current flow through the collector-emitter junctions remains substantially constant, and said third and fourth resistances form the resistance bridge to produce at the junction of said third and fourth resistances an output voltage corresponding to said antilog potential signal created at one of said collector-emitter junctions.

11. The bipolar log converter in claim 10 wherein said current control means vary current flow responsively to temperature changes in said first and second resistances whereby the current flow in said collector-emitter junctions remains substantially constant.

12. The bipolar log converter of claim 10 wherein said current control means include a second pair of transistors comprising PNP and NPN types connected emitter-emitter with like types mounted on a common chip with the first mentioned pair of transistors, and said second pair of transistors connected with their collectors to the junction of said first and second resistances and with their bases connected in reverse phase to the junction of said first and third, and second and fourth resistances whereby the collector-emitter junctions of said second pair of transistors provide a low impedance current path and a temperature change in one of the collector-emitter junctions produces an out-of-phase current through one of said first and second resistances of said bridge thereby compensating for a temperature induced-current variation in the nonlinear potential current conversion at the collector-emitter junctions.

13. The bipolar log converter of claim 9 wherein the ratio of current flows is at least 1 to 100,000.

14. The bipolar log converter of claim 9 wherein a voltage follower differential amplifier receives at one input the potential signal from said resistance bridge and the other input is connected through a temperature compensating resistance to circuit common and in a feedback loop to the output thereof whereby the potential signal at said output is representative of the current signal and corrected for temperature errors in said resistance bridge before applying said potential signal to said means for providing a readout.

15. The bipolar log converter of claim 9 wherein a feedback capacitance shunts the output and said one input receiving said current signal of said differential input amplifier whereby said capacitance compensates for rapid current polarity reversals as conduction terminates in one of said diodes and begins in the other of said diodes.

16. The bipolar log converter of claim 15 wherein a voltage follower amplifier is connected a first input to said output of said differential input amplifier and a second input to circuit common and said voltage follower amplifier has a feedback loop between said first input and output thereof and a series capacitance providing a current connection to said one input receiving said current signal of said differential input amplifier, and said series capacitance being a small fraction of said feedback capacitance of said differential input amplifier whereby the output voltage of said differential input amplifier moves smoothly voltagewise at slow rates of transition in conduction of said diodes and said voltage follower amplifier at fast rates of transition in conduction of said diodes has current gain to act through said series capacitance to regulate the output voltage of said differential input which moves voltagewise at a comparable rate to a slow rate of transition in conduction of said diodes.

* * * * *

UNITED STATES PATENT OFFICE
CERTIFICATE OF CORRECTION

PATENT NO. : 3,928,774
DATED : December 23, 1975
INVENTOR(S) : Homer M. Wilson

It is certified that error appears in the above-identified patent and that said Letters Patent are hereby corrected as shown below:

Column 1, line 67, for "voltagecurrent" read ---voltage-current---;

Column 2, line 50, for "linearlogarithmic" read
---linear-logarithmic---;

Column 12, line 29, for "71" read ---171---;
line 44, after "illustrated", insert ---a preferred---; and
line 54, for "puncture" read ---juncture---;

Column 13, line 60, for "eollectors" read ---collectors---; and

Column 14, line 49, for "at" read ---as---.

Signed and Sealed this eighteenth Day of May 1976

[SEAL]

Attest:

RUTH C. MASON
Attesting Officer

C. MARSHALL DANN
Commissioner of Patents and Trademarks